United States Patent [19]

Jones et al.

[11] Patent Number: 5,598,719

[45] Date of Patent: Feb. 4, 1997

[54] EVAPORATIVE COOLING APPARATUS

[75] Inventors: Michael Jones; Mark Hensley, both of Culver City, Calif.

[73] Assignee: CZ, LLC, Huntington, N.Y.

[21] Appl. No.: 562,361

[22] Filed: Nov. 22, 1995

Related U.S. Application Data

[63] Continuation of Ser. No. 261,474, Jun. 17, 1994, Pat. No. 5,497,633.

[51] Int. Cl.$^6$ .................................................. F28D 5/00
[52] U.S. Cl. .......................... 62/304; 62/259.4; 62/314; 239/290
[58] Field of Search .................................. 62/121, 259.4, 62/314, 304; 239/290; 52/2.21, 2.18, 302.5; 454/1

[56] References Cited

U.S. PATENT DOCUMENTS

| | | | |
|---|---|---|---|
| 2,083,436 | 6/1937 | Bothezat | 62/176.4 |
| 4,478,767 | 10/1984 | Wantanabe et al. | 261/130 |
| 4,679,350 | 7/1987 | Banta | 47/29 |
| 4,839,106 | 6/1989 | Steiner | 261/28 |
| 5,062,487 | 11/1991 | Siria et al. | 169/91 |
| 5,233,705 | 8/1993 | Gleman et al. | 4/496 |
| 5,349,829 | 9/1994 | Tsimerman | 62/314 |
| 5,497,633 | 3/1996 | Jones et al. | 62/314 |

Primary Examiner—Henry A. Bennett
Assistant Examiner—Pamela A. O'Connor
Attorney, Agent, or Firm—Eckert Seamans Cherin & Mellott

[57] ABSTRACT

An evaporative cooling unit has an internal conduit structure with an inlet and outlet, an air blower for establishing a forced air flow through the conduit, and a plurality of nozzles that emit atomized water into the air flow. The nozzles connect to a source of water such as a pump coupled to a tap water supply. Sprayed water mixes with the forced air flow and is emitted as a mist or fog, the temperature of the air and water being reduced via evaporative cooling. The unit can form an inverted L-shape, a column or a framework, e.g., forming a pavilion. The unit can be inflatable or can be formed by rigid hollow columns and/or horizontal beams that form the air conduits and contain one or more blowers as well as piping for carrying water to the nozzles. A ball joint discharge fixture having air exhaust holes surrounding a spray nozzle allows the mixed air/water output to be directed where needed to form a refreshing cooled area, especially in the open. The unit is advantageous for cooling athletes at competitions, spectators at events, fire fighters, etc., and in one embodiment forms a cooled outdoor station for vending machines or the like.

8 Claims, 8 Drawing Sheets

EVAPORATIVE COOLING APPARATUS

CROSS REFERENCE TO RELATED APPLICATION

This is a continuation-in-part of application Ser. No. 08/261,474, filed Jun. 17, 1994, now U.S. Pat. No. 5,497,633.

BACKGROUND OF THE INVENTION

1. Field of the Invention

The invention relates to air circulating and cooling devices, and in particular concerns an air circulating and cooling device with a spray means for establishing a cooled area. The area need not be confined by closed walls and can be, for example, an open "comfort station" area for multiple people who walk through, the location of a facility such as a vending area, an area of retreat or repair, such as a sports team's bench or a patio. The invention is also applicable to cooling areas generally, such as the spectator stands of a stadium or amphitheater.

2. Prior Art

Heat can cause substantial discomfort for persons engaged in activities as well as persons who may be relaxing outdoors or even spectating at the activities of others. Fire-fighters are exposed to heat stress on the job, which also may be extreme. There are well known techniques to combat the discomfort of heat stress, generally involving one or more of air conditioning (cooling and/or dehumidification), application of water to the person for evaporative cooling, forced air circulation, shade from the sun and so forth. However, in a given situation it can be impractical or impossible to employ such remedies freely. For example, air conditioning and dehumidification are wasteful of energy except in closed spaces; affected persons may not wish to drench themselves to cool off; shade may be unavailable at the desired location, etc.

The typical remedy for heat stress on athletes, spectators, fire-fighters and the like is to provide forced air circulation using fans and/or shade using some form of awning. More complicated solutions, such as providing refrigerated air, are not favored. A unit of sufficient capacity to provide meaningful relief in an open outdoor space would be prohibitively expensive. A permanent installation would be impractical for occasional use, and a temporary installation would require a team of workers to move, set up, operate and maintain. Whether the installation is temporary or permanent, means would be needed either to vent the warm side of the cooling device or to move refrigerated air to the area where needed. Numerous smaller units might be deployed, but this simply multiplies the problems. Such outdoor cooling devices are simply too expensive and inconvenient to acquire, install or store and transport, operate and maintain.

SUMMARY OF THE INVENTION

It is an object of the invention to provide a cooling unit for spaces, especially open spaces that are not confined within closed walls, that cools comfortably and efficiently, at minimum expense.

It is a further object to provide a cooling apparatus optimized for use by athletes, fire-fighters, spectators, and attendees of amusement parks and events, providing a cooled area in an otherwise open space.

It is also an object to cool a predetermined area using a non-refrigerated coolant, especially plain water, and to provide an evaporative cooling means by atomizing the water in a forced flow of air.

It is another object of the invention to provide construction particulars apt for such a cooling device, including a substantially portable inflatable version having flexible walls forming a partially sealed enclosure, the inflatability making the unit portable, and a fixed structure version having means for delivering forced air and atomized water to one or more discharge ports.

These and other aspects and objects are provided according to the invention in an evaporative cooling unit having structure defining a conduit with at least one outlet leading into an open space, preferably not enclosed substantially by walls, a blower for forcing ambient air from an inlet through the conduit to exhaust through the outlet, thereby producing an air flow into the space, atomizing spray nozzles along the conduit, preferably downstream of the blower adjacent the point of discharge, and means for connecting the spray nozzles to water under pressure. The spray nozzles discharge atomized water into the forced air flow to provide a damp or misted stream of air, evaporation cooling the atomized water and the flow generally, to provide a cool area within the open space.

One or more porous membranes can also be positioned to intersect the air flow such that air passes through the porous membrane and is thereby cooled. At least some of the nozzles can be arranged to soak the porous membrane with coolant for this purpose. At least some of the nozzles can be mounted in the conduit upstream of the outlet along the air flow, whereby the coolant is mixed with the air flow internally of the cooling unit.

According to one embodiment, the conduit is rigid and is defined at least partly by a fixed structure such as a hollow column, pillar, wall panel or the like. This structure can form a pavilion, with or without a roof or awning, and air flow is drawn into the structure and directed by the conduit to one or more discharge ports directed downwardly onto persons therein. Alternatively or in addition, a partially sealed enclosure of thin flexible material can define all or part of the conduit. In a portable embodiment, a fan is mounted in a base portion and directs air through a flexible conduit having a flow restriction, in particular at the discharge port(s), such that the conduit is inflated due to back pressure and thereby raises the discharge port(s) above the base. When the fan is not operated, the conduit deflates, making the device readily portable. The structure of the flexible conduit can include plenums defined between inner and outer walls, which are inflated by internal pressure through openings in the internal walls. When inflated, the plenums lend a rigidity to the conduit, making it useful as a standing column or as a column forming a part of a pavilion or similar structure.

The coolant water can be tap water at the pressure provided by a public utility, atomized by discharge through small diameter openings, venturi structures or the like. Alternatively, pressurized water can be provided from a tank at atmospheric pressure through a pump. Likewise a booster pump can be provided to increase the pressure from a pressurized tank. Spray nozzles are attachable to the enclosure and aimed to spray coolant such as water into the stream of air discharged through the outlet.

Some of the sprayed water evaporates in the forced air to reduce the temperature of the discharge as compared to ambient temperature. More particularly, both the air and the remaining droplets in the stream have a temperature lower than their initial temperatures due to evaporative cooling. The cool mixture of air and droplets is directed into an area, for example as a defined pattern in either a cloud or a stream, providing a place in which persons can cool down.

There are a number of appropriate locations for a cooling air/water or fog mixture as provided according to the invention. The cooling flow can be directed into the open air such as at spaced points along a wall, outwardly from a vertical column or horizontal pipe, between several columns defining a structure such as a pavilion, downwardly from an overhead structure, etc. Combinations of these arrangements are also possible.

By choice of how finely the water or similar coolant is atomized when sprayed into the air stream and the distance between the point of discharge and the location of persons, the effect can be varied from one of cool humid air or fog at one extreme, to a flow of air similar to a drizzle, or to a combined flow of air and spray of water at the other extreme. However, finely atomized water is preferred to avoid soaking the people in the area, and the point of discharge is preferably spaced from the people to permit a portion of the volume of water to evaporate before reaching the people.

In a particularly preferred arrangement the invention is applied to areas that are visited briefly by persons, who do not remain long enough to become wet. For example, an evaporatively cooled open-walled pavilion can be placed at an amusement area, park or entertainment event, that people can walk through. A partly open-walled evaporatively cooled building can shelter a vending station, the location of a water fountain, or other location that people visit briefly. Where the people are not concerned about becoming wet, such as at pools or water parks or athletes at sporting events, or perhaps at their own patio or sunbathing location, a more robust water spray can be used.

It is an optional inventive aspect to include a soaked porous membrane through which air flow is passed, to cause further evaporative cooling. In that case the conduit includes an intake port through which the fan draws in ambient air. The porous membrane is placed across the conduit and a sprinkling system connected to the water source to soak the porous membrane continuously with water. The porous membrane can be placed downstream of the fan in the direction of air flow, or upstream if the fan motor is suitably protected.

According to another aspect, the evaporative cooler of the invention can have an inflatable conduit, which can be self supporting. A conduit with a central passage can be surrounded by an inner wall that is in turn surrounded by an outer wall, forming a chamber between the inner and outer walls, preferably connected along lines to define circumferential or longitudinal ribs. The inner wall can have apertures arranged to allow air to escape from the central passage or enclosure into the chamber between the inner and outer walls to inflate the chamber or its ribs. Alternatively, closed chambers can be provided and inflated in another manner.

The nozzles and air outlet(s) can be arranged in different ways to achieve different shapes in the discharged cooled air. For example, the chamber can be provided with multiple outlets and nozzles cooperatively arranged in nozzle and outlet pairs such that the nozzle of each pair is mounted in a middle of the outlet of the pair. In this arrangement, the exhaust and spray mixture is discharged in the shape of a cloud or the like in which persons can immerse themselves. For another example, the nozzles are arranged at spaced locations in a plane common with a single, relatively large outlet. By this arrangement, the exhaust and spray mixture define the shape of a billowing stream which can be aimed up, at an incline, horizontally or downwardly, so that persons can walk through or under the point of discharge to immerse themselves and to be cooled.

A pavilion embodiment of the invention, which can be inflatable or provided with fixed structural supports such as columns, walls, studs, etc., has three or four leg segments (although any number is possible) and several overhead segments arranged in a preferably open framework. The air outlets and spray nozzles can be arranged on the overhead segments and directed downwardly. Alternatively or in addition, a cooling discharge can be directed inwardly from the columns or sidewalls to the inside of the pavilion, or the discharge can directed both inside and outside.

The nozzles can be spaced back along the air flow path from the discharges, thereby spraying into the air flow within the conduit. Among other things, this mounting provides a longer distance to effect evaporation and mixing of air and water than an arrangement in which the spray nozzles are at the outlets.

A spray nozzle can be mounted inside the conduit but adjacent to a porous membrane placed across the outlet. The porous membrane defines a flow restriction that is useful if the conduit is inflatable because the conduit itself can be inflated in this manner. Such a porous membrane causes the air and evaporating water to exhaust in the shape of a diffuse cloud which can be directed onto persons, for example, standing under a pavilion.

Another arrangement of the nozzles couples the nozzles with multiple, discrete outlets, the nozzles and outlets being cooperatively arranged in nozzle and outlet pairs such that the nozzle of each pair is mounted in a middle of the outlet of the pair. This arrangement likewise discharges in the shape of a cloud which can be directed onto the persons. Advantageously, the nozzle and outlet pairs comprise a plurality of universal joint discharge members mounted in a wall of an air carrying conduit, enabling the discharge to be directed as desired.

In an alternative embodiment, the portable evaporative cooling unit is arranged to define an inflatable tower which is easily portable in that it collapses longitudinally when deflated. The tower carries nozzles mounted high up on the tower in positions and directions such that the nozzles rain down the evaporative coolant.

A number of additional features and objects will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

Figure 1:
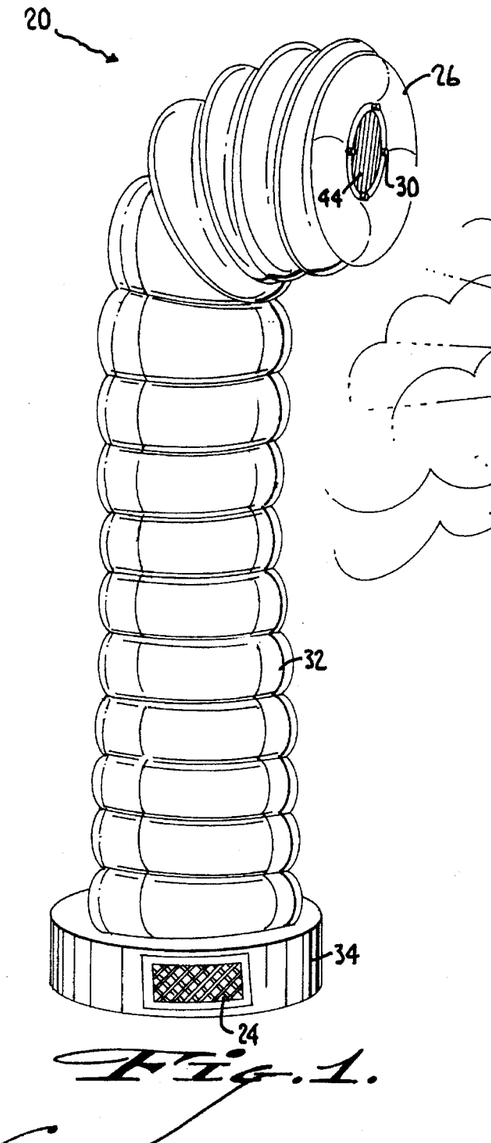
FIG. 1 is a perspective view of a portable indoor and outdoor evaporative cooling unit according to the invention, with an inflatable housing.
Figure 2:
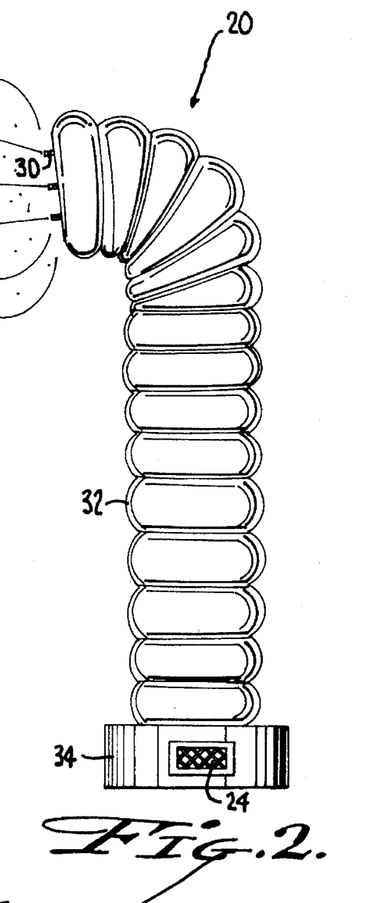
FIG. 2 is a side elevational view thereof.
Figure 3:
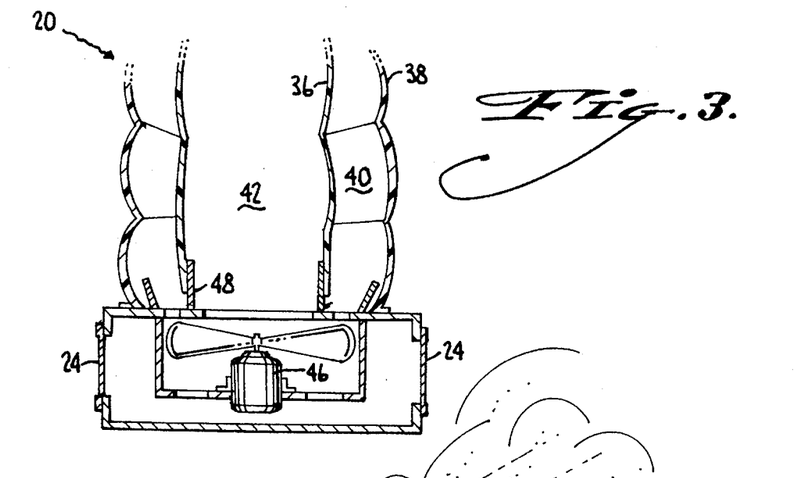
FIG. 3 is an enlarged partial section view, partly broken away, taken through the base portion of the embodiment of FIG. 2.

FIGS. 1–3 show a portable version of an indoor/outdoor evaporative cooling unit 20 according to the invention. Cooling unit 20 uses evaporative cooling to reduce the temperature of ambient air by drawing in ambient air through an intake 24, and exhausting the air through a ring 26 of nozzles 30 while spraying coolant such as tap water into the exhaust stream. The air and liquid coolant mix together, and due to evaporation, the temperatures of both the air and the water are reduced relative to their initial temperatures. The mixture is directed onto persons to be cooled, in the general vicinity of unit 20, and insofar as unevaporated droplets of coolant remain in the air flow and are sprayed onto the persons, further evaporative cooling is achieved.

Cooling unit 20 in FIGS. 1 and 2 comprises an inflatable structure 32 which when deflated (not shown) is conveniently portable. Unit 20 is inflated for use, preferably by operation of the same blower that produces the forced air flow. The embodiment shown in FIGS. 1 and 2, for example, has a series of annular segments, enabling the structure to collapse along its longitudinal axis when deflated.

Cooling unit 20 is advantageously used at athletic events or practices, on athletes and/or spectators, on fire-fighters during fire-fighting, and other attendees or spectators involved in activities likely to cause heat stress. Typically unit 20 is used outdoors, although indoor use is also possible. The inflatable structure 32 is shown inflated in the drawings and is disposed standing upright on a base 34 that provides some ballast and stability.

Inflatable structure 32 in FIGS. 1–5 has a double wall arrangement, comprising an inner wall 36, and an outer wall 38 surrounding the inner wall. The inner and outer walls 36 and 38 cooperatively define a relatively sealed enclosure 40. The inner wall 36 further defines a conduit with chamber 42 leading from an inlet at the base to an outlet 44, and this chamber 42 is substantially surrounded by the enclosure 40. Walls 36 and 38 are formed of a thin flexible material such as a pliable resinous material, sealed canvas or the like.

Inflatable structure 32 is kept inflated via a fan 46 mounted in base 34. Fan 46 is electric and can operate on conventional line voltage, for example comprising a 1.5 HP motor operable at 120 VAC. The blades of fan 46 direct a flow of air into a housing that leads to a flow divider 48. Fan 46 operates continuously in use as needed to keep unit 20 inflated and relatively rigid, and draws ambient air in through one or more inlets or intakes 24 in base 34. Flow divider 48 can have a ring shape. Air flow through the center of the ring is directed to chamber 42 and eventually to the discharge outlet(s); and air flow outside the ring is directed to enclosure 40 for inflation purposes, inducing structure 32 to stand upright in the inflated shape shown. Enclosure 40 can be vented in a controlled or restricted manner through a series of apertures 54 (see FIG. 5) between enclosure 40 and chamber 42. Apertures 54 form flow restrictions that meter the escape of air from enclosure 40 for maintaining the desired pressure difference between the enclosure 40 and the ambient air.

Forced air is discharged from enclosure 40 and/or chamber 42 at an outlet 44 in the end of structure 32. The flow rate of the forced air preferably is considerable, such that at least nearby the structure the discharge forms a defined stream. An inventive aspect includes the mounting of spray nozzles 30 in the plane of the outlet 44 for emitting a spray of water into the flow. In the embodiment shown, four nozzles 30 are interconnected by a ring manifold 26 which is supplied pressurized water or other coolant by suitable, preferably flexible flow connections and a pump (not shown).

Nozzles 30 are arranged in an array, and in the embodiment shown the nozzles are opposite one another around ring 26. Thus a general area of cooling is set up surrounding unit 20. It is also possible to provide a cooled area on one side of the structure, etc., by suitable arrangement of nozzles 30, or by providing means (not shown) for opening and closing the nozzles or the spray of water associated with them. Manifold 26 and spray nozzles 30 can be removably attachable to inflatable structure 32, such that they can be detached from structure 32 upon deflation, for transportation and/or storage.

The preferred coolant is simply water. Filtered tap water can be provided and pressurized through a booster pump. A high pressure pump is advantageous to obtain good atomization of the coolant immediately adjacent to the point of exit through nozzles 30. As a result, evaporative cooling is enhanced because atomized coolant vaporizes in the air more quickly than larger droplets. The drawbacks of high pressure atomization include the relatively smaller orifice size in nozzles 30, which may become clogged by suspended particles in the coolant, or by accumulation of lime or the like. These problems can be minimized by filtration and/or water treatment. The advantages of the invention also can be accomplished with water from a domestic supply, typically at 40 to 60 psi. With a pump and/or booster, the pressure may be raised to 1400 psi or more.

The spray nozzles 30 are oriented to spray the coolant, such as tap-water, into the air discharged through outlet 44. The water is presumed to be at or below ambient air temperature, but could be lukewarm and still be cooled by evaporation. Due to evaporative cooling, the advantages of the invention are achieved without the expense and complexity of refrigeration of the air or water, and the device is apt for use in relatively open arrangements to achieve cooling without dissipating a great deal of electric power. The coolant mixes with the stream of exhausting air, during which some of the liquid coolant is vaporized by evaporation (preferably most of the coolant). The resultant mixture is cooler in temperature than the coolant or ambient air because of the evaporative cooling process. The mixture is also, of course, more humid than the ambient air, but is refreshing to persons in the affected area.

The cooled air/water mixture flows turbulently from outlet 44, preferably in a relatively defined stream. Inflatable structure 32 is shaped and sized to direct the stream on persons in the area. For example, structure 32 can be located behind the benches on the sidelines of an athletic event such as a football game or practice to cool down the athletes between plays.

With a given extent of mixing of the air and water, the actual temperature achieved by evaporative cooling varies with the initial dryness of the ambient air. For example, given dry warm air at 95° F. (35° C.) and 20 percent relative humidity, atomizing even ambient temperature water therein can drop the temperature of the mixture to as low as 66° F. (19° C.). However, if the same ambient air at 95° F. has a relative humidity of 50 percent, then atomizing the water only drops the temperature of the mixture to about 80° F. (27° C.). Frequently, with tap water from the domestic supply, the water will be relatively cool as a result of flowing through underground pipes, which helps to make the mixture cooler than warmer water.

The evaporative temperature change results from extracting heat energy from the air and using the energy to change the phase of the water from liquid to vapor. Thus the temperature change is achieved without the introduction of external refrigeration power. There is no need to discharge waste heat elsewhere, because apart from energy expended to induce flow of air and water using a blower and optionally a water pump, no energy is added or subtracted. The latent heat energy expended in vaporization is drawn from the warm air, which accounts for the temperature drop.

Figures 4, 5:
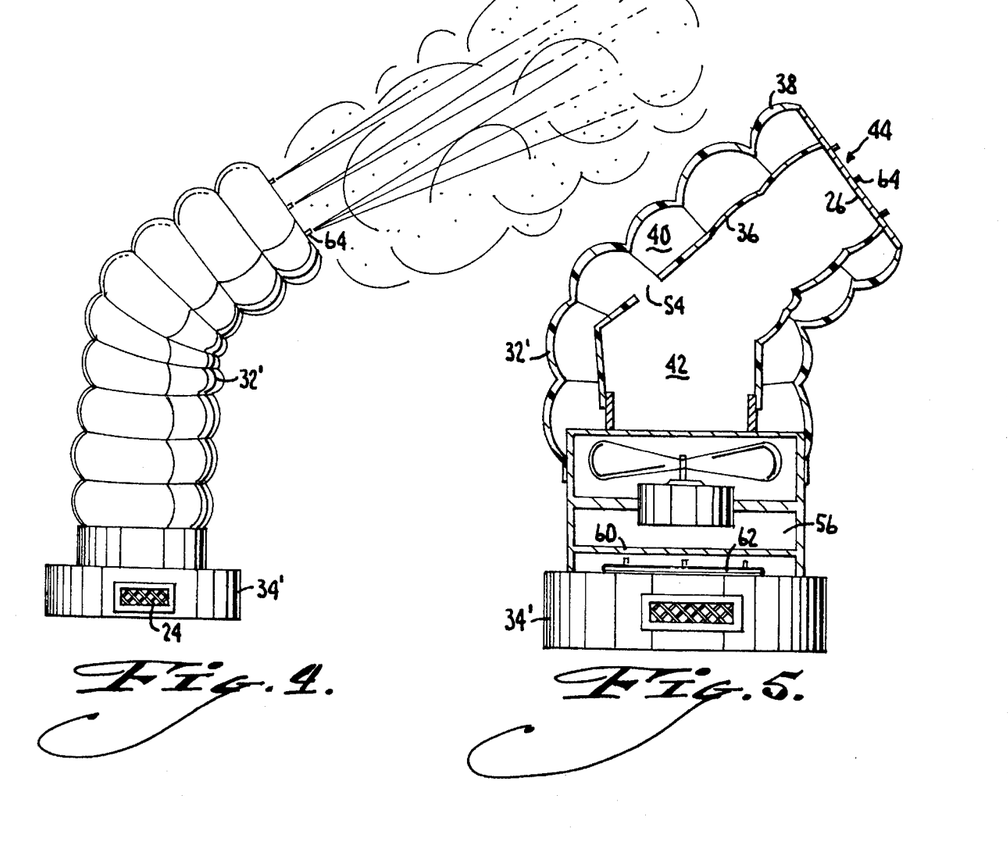
FIG. 4 is a perspective view of an alternative embodiment of the invention, with an inflatable housing exhausting a stream of mist and/or spray at an incline.
FIG. 5 is an enlarged partial section view, partly broken away, of the embodiment of FIG. 4.

FIGS. 4–5 illustrate an embodiment that provides for enhanced atomization of the coolant in the air. The structural elements in FIGS. 4–5 are generally the same as in FIGS. 1–3, excluding the overall shape of the inflatable structure 32' in an inverted-L, except that the base 34' is somewhat different. Between the intake port 24 and the fan 46, there is an enlarged entrant portion 56. The entrant portion 56 is substantially obstructed by a porous diaphragm or membrane 60 at a position between the intake 24 and the fan 46. A sprinkling system 62 is mounted adjacent the membrane 60 and is connected to the water source. The sprinkling system 62 is mounted to continually soak the porous membrane 60 with coolant. The air that is drawn in by the fan 46 must migrate through the porous membrane 60, and while doing so, loads up with fine droplets and/or vapor of the coolant. By this arrangement, the effects of evaporative cooling are enhanced. One or more wetted porous membranes can be placed across all or part of the flow path at various points along the structure.

In FIG. 4, nozzles 64 at the outlet have orifices (not shown) sized for producing jets of water. The combined effects of the enhanced evaporative cooling in the entrant portion with large jets of these nozzles 64 cooperatively produce a drenching cooling experience for persons immersing themselves in the discharge. This embodiment is particularly useful for fire-fighters during fire-fighting. Fire-fighters are subject to substantial problems with heat and normally have no concerns about being drenched.

Figures 6, 7:
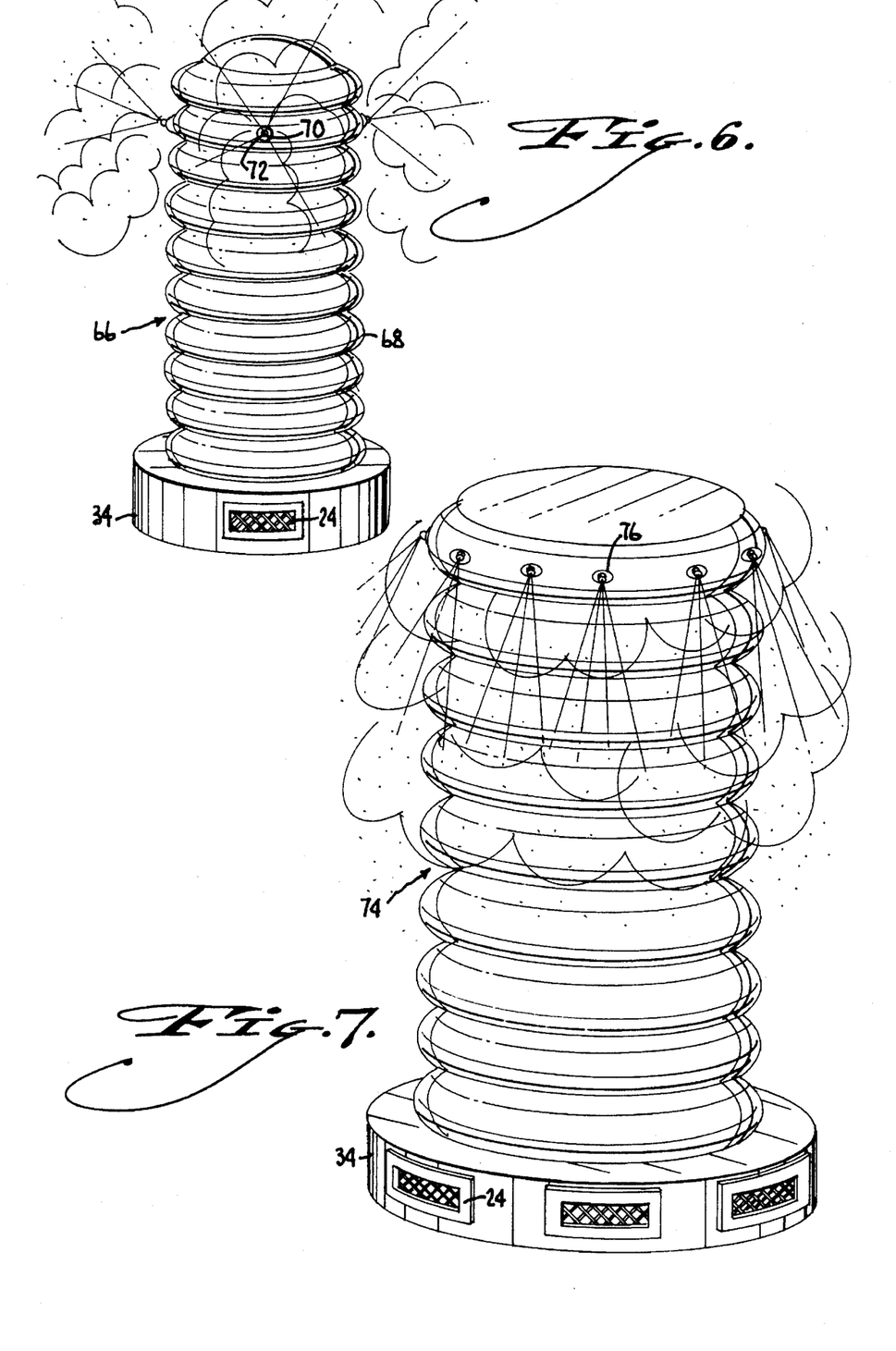
FIG. 6 is a perspective view of another embodiment of the invention, with an inflatable vertical tower having sides carrying outwardly-directed nozzles.
FIG. 7 is a perspective view of a further embodiment of the invention, with an inflatable vertical column having a rim carrying outwardly and downwardly directed nozzles.

FIG. 6 illustrates an alternative inventive aspect wherein inflatable structure 66 is formed of a single flexible wall 68 defining an enclosure (not shown) ventilated with a plurality of outlets 70. Outlets 70 are combined with corresponding nozzles 72 in nozzle and outlet pairs. The nozzle 72 of each pair is mounted in a middle of the outlet 70 of the pair. A fan (not shown) in the base 34 forces air to pressurize the enclosure, and inflate wall 68. The air is vented via flow restricting outlets 70. In this arrangement, the discharged air from each outlet 70 mixes with the sprayed coolant of one nozzle 72, and the combined effect of the multiple nozzle and outlet pairs produces a defined pattern or shape of a billowing exhaust in the form of a cloud or the like in which persons can immerse themselves to cool down.

In FIG. 7, another embodiment of the portable evaporative cooling unit is arranged to define an inflatable tower 74. The tower 74 resembles an enlarged soda or beer can and can be suitably decorated with an advertisement or logo, for use in sporting events and the like. Tower 74 has a plurality of nozzles 76 attached at the upper periphery, spaced and oriented such that nozzles 76 shower or rain down water on persons walking close by.

FIGS. 8–11 show a further inventive aspect wherein the structure is shaped to resemble a pavilion 78. Pavilion 78 comprises several segments 80–84 formed in the single wall configuration of FIGS. 6–7, inflatable by one or more fans or blowers (not shown). Pavilion 78 comprises four leg segments 80 and five overhead segments 82 and 84, arranged in a framework. The four side overhead segments 82 have lower portions provided with a plurality of outlets 86.

Figure 8:
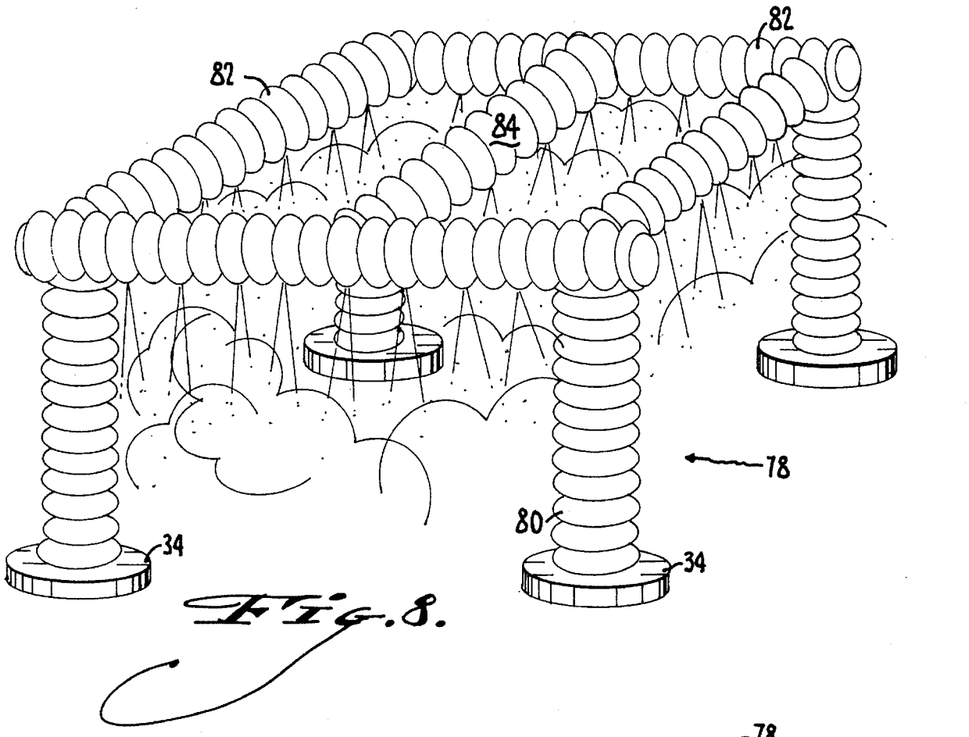
FIG. 8 is a perspective view of an additional embodiment of the invention, with an inflatable pavilion having overhead beams exhausting downwardly-directed evaporative-cooled air.

The outlets 86 can be arranged in different ways to accomplish different shaped discharges. For example, outlets 86 can be paired with nozzles 88 at spaced positions on the side overhead segments 82 and adjacent to the outlets 86. The nozzle 88 of each nozzle and outlet pair is mounted in a middle of the outlet 86 of the pair. By this arrangement, the air and spray exhaust defines a cloud directed inwardly or downwardly onto persons standing in pavilion 78.

Figure 9A:
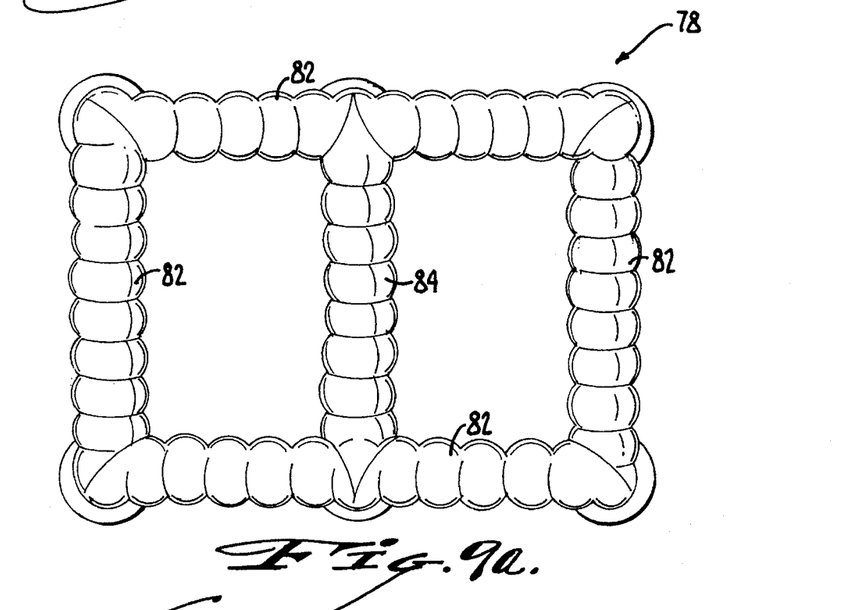
FIG. 9a is a top plan view thereof.
Figure 9B:
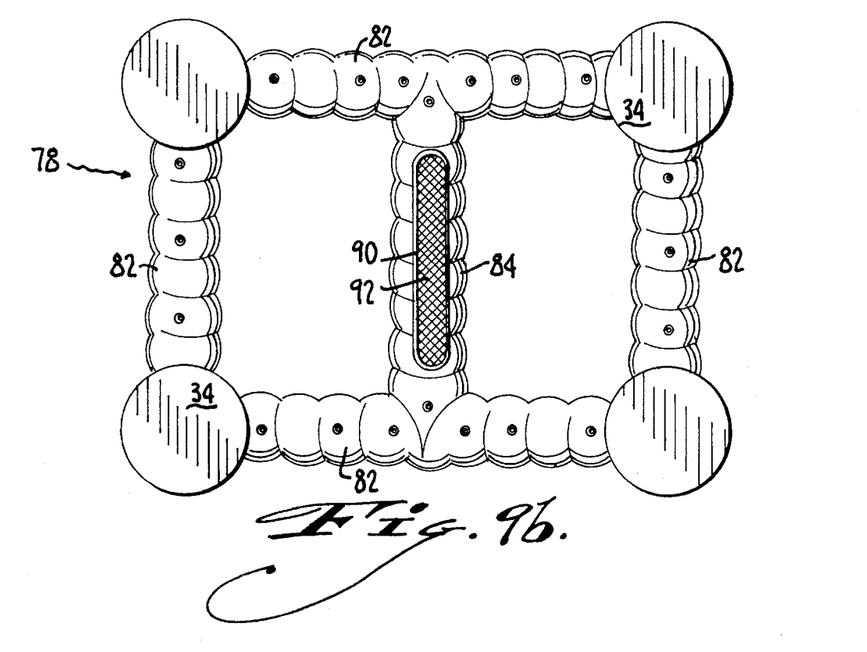
FIG. 9b is a bottom plan view thereof.
Figure 10:
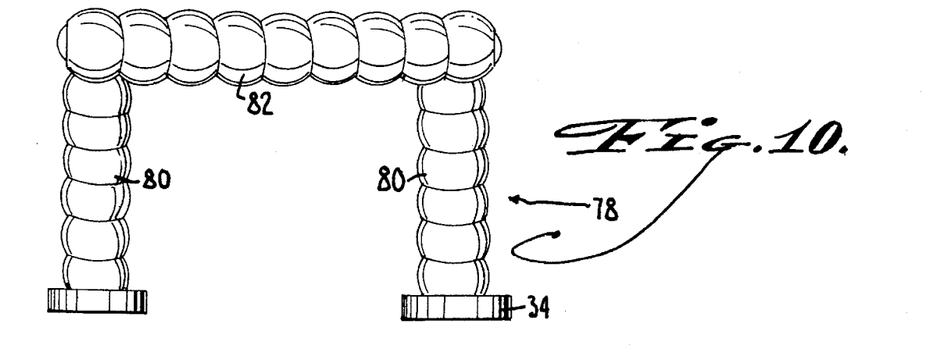
FIG. 10 is a side elevational view thereof.
Figure 11:
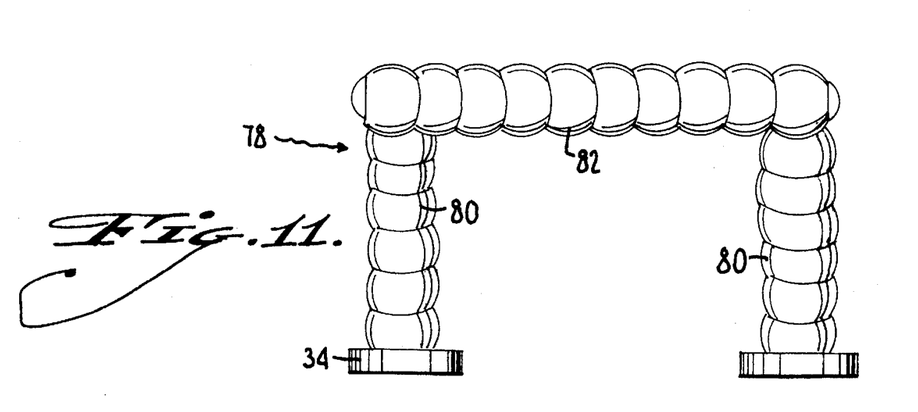
FIG. 11 is a front elevational view thereof.

In FIG. 9b, the central segment 84 features an alternative outlet 90. The outlet 90 is elongated and covered with a porous membrane 92. The porous membrane 92 has two main advantages. Porous membrane 92 forms a flow restriction to controllably vent or meter the discharged air from within the inflated segments 80–84 to maintain inflation. Porous membrane 92 also acts to enhance mixing of the air and water, and hence maximizes evaporative cooling.

Figure 12:
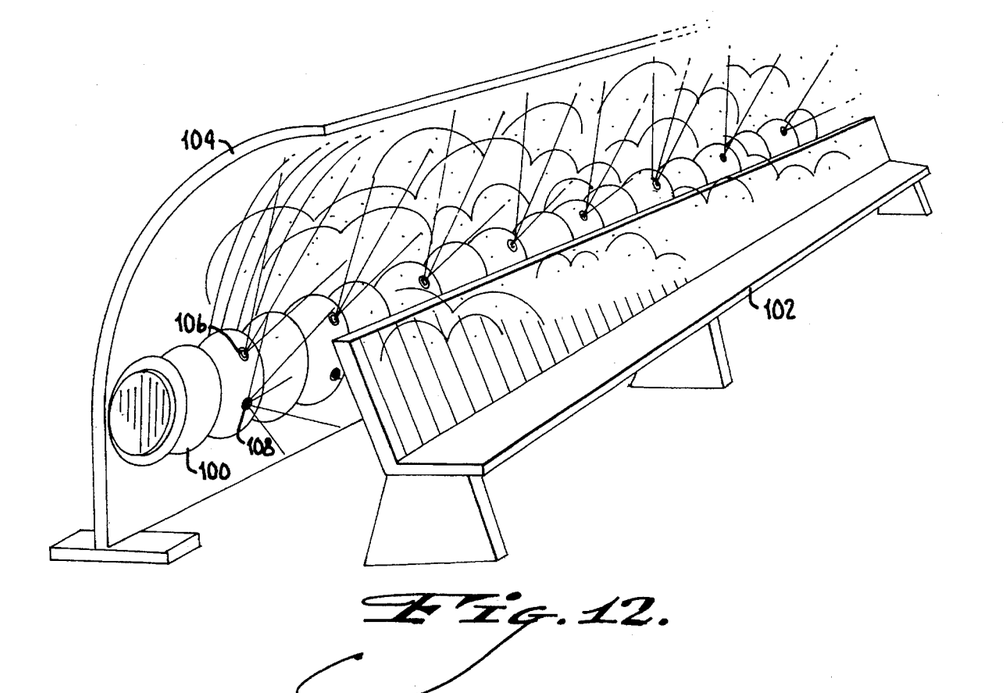
FIG. 12 is a perspective view of yet another embodiment of the invention, with an inflatable pipeline disposed horizontally between a sideline bench and a plexiglas shield.
Figure 13:
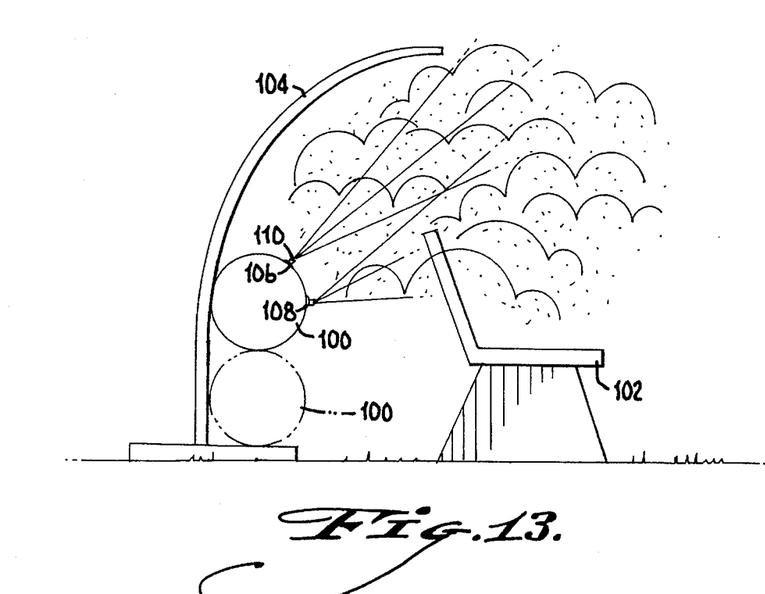
FIG. 13 is a side elevational view thereof.

FIGS. 12–13 show another embodiment, wherein a single wall inflatable structure 100 as in FIG. 6 is oriented horizontally. The inflatable structure can be mounted off the ground as shown in solid lines in FIG. 13, or on the ground as shown in broken lines. This embodiment is particularly adapted to cool players on a bench 102, for example at a soccer contest. The inflatable unit can be placed against or mounted on a plexiglas shield 104 that confines the cooling discharge and also has the advantage of shielding the players against objects thrown from the stands.

Inflatable structure 100 has outlets 106 and 108 aligned in two rows. In the upper row, each outlet 106 is paired with a nozzle 110 as above, for atomizing coolant in the discharged air. In the lower row, the outlets 108 are without nozzles, and merely exhaust forced air at the ambient temperature. In conjunction with shield 104, the two rows of nozzles 106 and 108 cooperate to lift, carry, and drop the cooled exhaust of the upper row of outlets 106 onto the bench 102. By this arrangement, defined flow patterns can be shaped and selected for the most advantageous cooling in the region of the bench 102. Alternatively, or in addition, the air in inflatable structure 100 can be pre-cooled via the sprinkling system and porous membrane 62 and 60 shown in FIG. 5.

Figure 14:
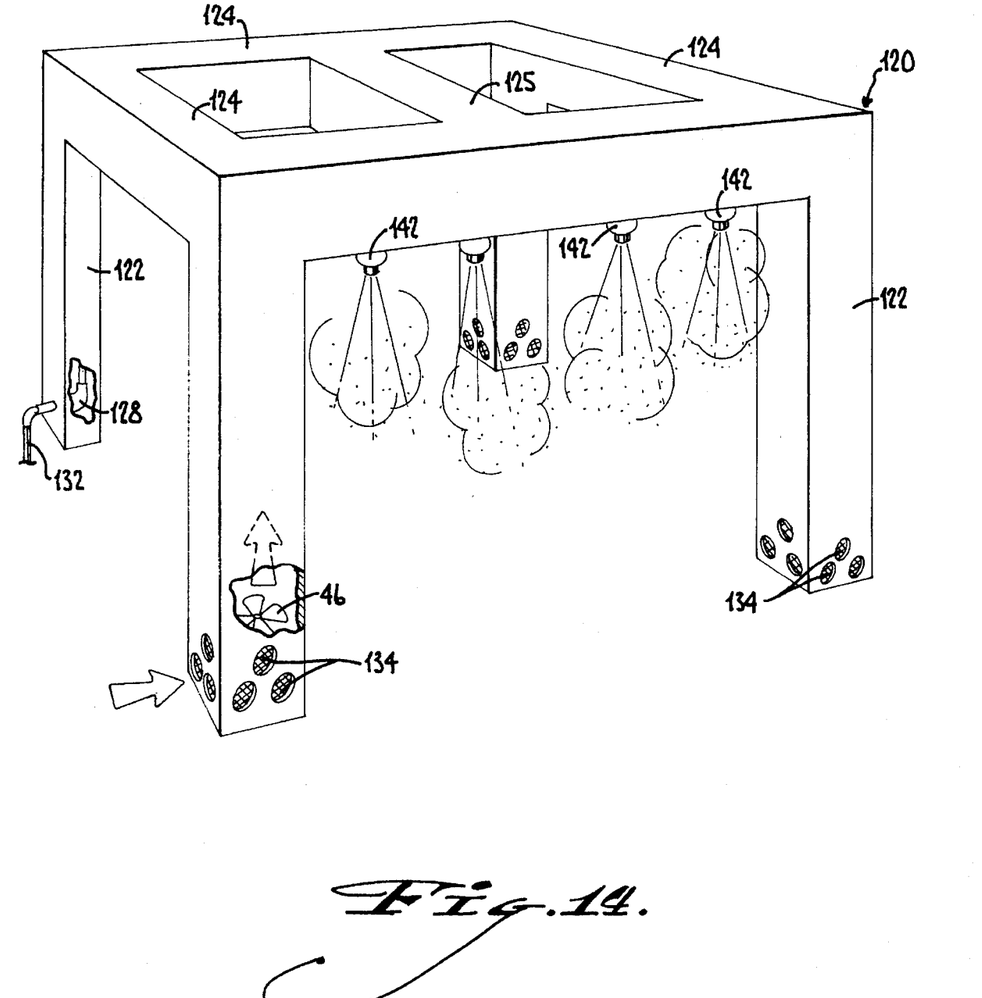
FIG. 14 is a perspective view illustrating application of the invention to a rigid pavilion structure.

FIG. 14 illustrates the application of the invention to a fixed structure 120. Structure 120 generally defines a pavilion having a frame of hollow air-carrying conduits as above, except that the air carrying conduits comprise rigid wood or plastic rather than inflatable tubes. A roof member (not shown) is possible but is not strictly required and has not been illustrated for a better view of the pavilion. The columns 122 of pavilion 120 can comprise, for example, 0.75 inch (2 cm) marine plywood walls forming hollow conduits, e.g., 18 inches (45 cm) on a side, and being suitably sealed along their seam with caulking or the like to confine air flow. In the embodiment shown, four columns 122 support four peripheral horizontal beams 124, and one or more crossing intermediate beams 125. The beams likewise are hollow, and can be about the same size as the columns, such that the structure forms hollow air carrying conduits as well as structure for enclosing the necessary blower(s) 46, one being shown at a cutout, and preferably at least one pump 128 connected to a source of coolant water, such as regular tap water at standard utility pressure.

Figure 15:
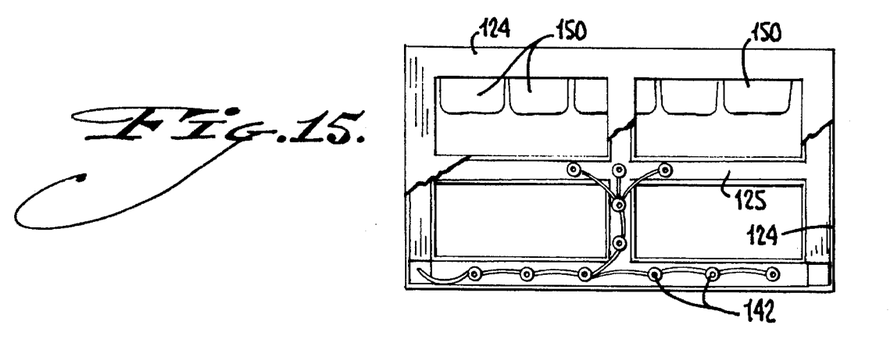
FIG. 15 is a top plan view of the embodiment of FIG. 14, with the top walls partly cut away to show a preferred location of the discharges.
Figure 16:
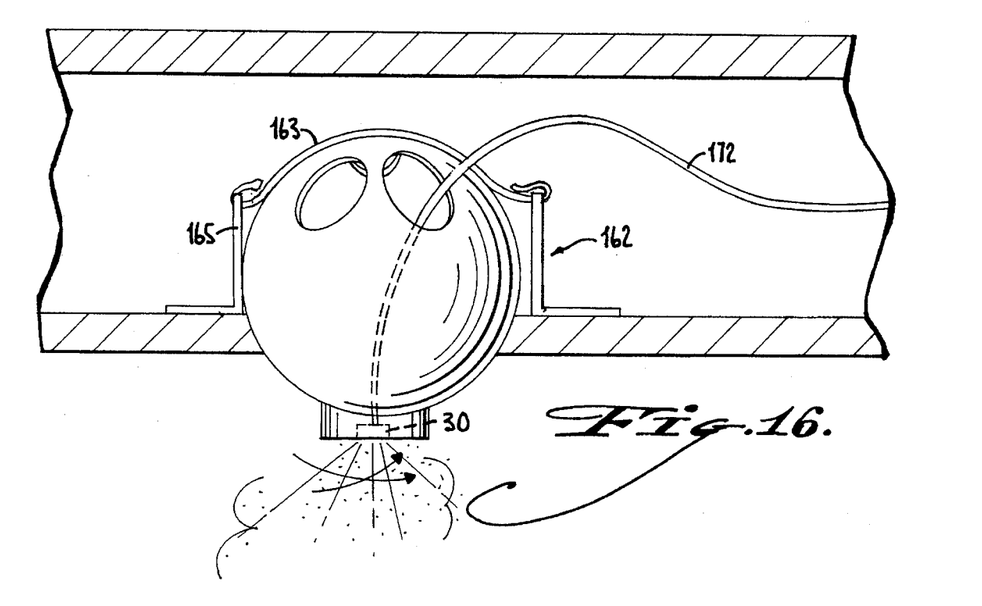
FIG. 16 is a section view along line 16—16 in FIG. 15, showing a preferred directable ball shaped discharge member; and, FIG. 17 is a partial bottom plan view showing the configuration of one of the discharge members.
Figure 17:
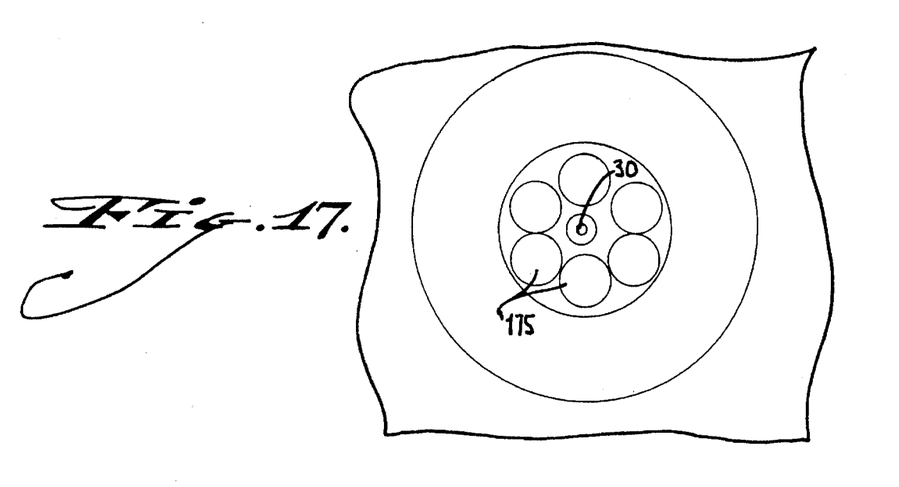

Columns 122 have air inlets 134, for example adjacent their bottom ends, through which air is drawn by one or more blowers 46. As shown in FIG. 15, the columns 122 are coupled to beams 124 at their tops, and the beams are in turn coupled to crossing beam 125 such that the entire structure forms an air carrying conduit arrangement. In the embodiment shown, three of four columns has a blower operated by an electric motor, for example a 1.5 HP single phase induction motor operable at 120 VAC and 20 A, which draws air in through an associated air inlet and forces the air upwardly into the column. The remaining column houses water pump 128.

A plurality of generally downwardly directed discharge outlets 142, which can be aimed, are provided on the undersides of beams 124, 125, and discharge forced air from the inside of the beams and columns, downwardly onto persons in the pavilion, which is a substantially open walled structure. Each of the discharge outlets 142 has one or more atomizing spray nozzles coupled to the water supply, preferably via the pump. The pump can comprise a high pressure motor driven pump, for example a 2 HP single phase induction motor driven pump, also operable at 120 VAC, which adequately supplies water to ten or more discharge outlets.

As shown in FIGS. 16 and 17, discharge outlets 142 can comprise directable universal joint ball-shaped couplings mounted in the undersides of one or more of the beams, so that the discharge of forced air and water droplets or fog can be directed to a desired area of the pavilion, and concentrated in particular areas. In a preferred arrangement, the pavilion forms a cooling station associated with additional means 150, such as soda vending machines, a drinking water fountain or the like (not shown) disposed in the pavilion, for example at the rear and/or sides. The directable universal joint discharge fixtures enable the flow of air and water to be directed onto persons in the area as opposed to onto the machines or the like. Accordingly, discharge outlets are provided in the embodiment shown at spaced points along the front beam, and along the front part and central parts of the intermediate crossing beams. As a result, the cooling flow can be directed substantially downwardly and inwardly at the front beam onto persons entering the front of the pavilion, and generally downwardly and outwardly from the intermediate beams, forming a general area of cooling. Of course other configurations are possible, such as an arrangement in which persons come in from all directions to visit vending machines or the like located centrally, in which case the discharge outlets could be placed or concentrated at the periphery, or in the walls of the columns, etc.

There are various ways in which the discharge outlets could be coupled to the conduits so as to enable aiming. For example, goose neck connections, rotatable fittings that dispense partly radially and the like are possible. Referring to FIG. 16, one possibility is a ball shaped universal joint that can be freely rotated in an opening in the conduit wall. Ball-shaped fixture 162 is held in an opening in the conduit wall, for example being held against the opening by one or more straps 163 attached to flanges 165, for frictionally holding fixture 162 at the orientation where it was left, and allowing manual reorientation. The ball portion has one or more holes on the rear side thereof, for admitting air from the conduit, and also permitting passage of water connecting line 172 for coupling to spray nozzle 30 at the extreme outlet.

As shown in FIG. 17 from below the discharge of FIG. 16, nozzle 30 is disposed centrally in an array of air outlets 175. Nozzle 30 emits a fine spray or mist into the flow of air from outlets 175 and mixes turbulently while flowing and falling downwardly onto the persons in the pavilion.

In its most simple form, the invention is simply turned on and operated continuously at full power. It is also possible, however, to make the device controllable, for example to switch on only when the temperature and/or humidity reach a predetermined setpoint, or to vary the rate at which air and/or water are discharged by use of variable speed motors for the blower and water pump.

The rate at which air and/or water are discharged depends on the particular application. For situations where persons are not concerned with getting wet or are already wet, e.g., from perspiration, a more vigorous spray of water may be appropriate. For situations where persons are to be cooled without getting wet, such as spectators at a sporting event or persons who briefly visit a vending area at an amusement park or the like, a higher flow of air and lower flow of water are more appropriate.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. An evaporative cooling unit comprising:

a hollow structure defining an elongated chamber with at least one air inlet and at least one discharge outlet;

a blower disposed within the structure between the inlet and the outlet, the blower drawing ambient air into the chamber and forcing the air through the outlet to establish an air flow;

a source of pressurized water;

at least one atomizing spray nozzle coupled to the source, for emitting atomized water into the air flow; and, wherein the discharge outlet is redirectable for establishing an area of cooling adjacent to the structure.

2. The cooling unit of claim 1, wherein the structure comprises a rigid hollow column defining the elongated chamber.

3. The cooling unit of claim 2, wherein the structure defines a substantially open framed pavilion with vertical columns connected to horizontal beams, the elongated chamber extending through at least one of said columns and at least one of said beams.

4. The cooling unit of claim 3, wherein at least one said blower is mounted in one of the columns coupled for air flow into at least one of the beams, and wherein a plurality of the discharge outlets are disposed on said one of the beams.

5. The cooling unit of claim 3, comprising a plurality of blowers, each mounted in one of the columns, and wherein the columns and beams are coupled together such that the blowers commonly supply air to the beams, a plurality of said outlets being disposed on the beams for directing air flow downwardly onto occupants of the pavilion.

6. The cooling unit of claim 3, wherein the structure is configured for housing a vending area in a limited area of the pavilion, and wherein a plurality of said outlets are provided for directing air flow inwardly into the pavilion, the discharge outlets being directed exclusively at areas other than the vending area.

7. The cooling unit of claim 3, wherein the pavilion has at least three columns coupled by at least three beams, and wherein at least some of the discharge outlets are disposed to direct the air flow downwardly from the beams.

8. The cooling unit of claim 1, comprising a plurality of redirectable outlets on the structure, each having at least one air outlet and at least one atomizing spray nozzle.

* * * * *